United States Patent [19]

Iinoya et al.

[11] 4,024,985
[45] May 24, 1977

[54] POWDER FEEDING APPARATUS AND METHOD

[75] Inventors: Koichi Iinoya; Hiroaki Masuda, both of Kyoto; Kinnosuke Watanabe, Kawasaki, all of Japan

[73] Assignee: Sankyo Dengyo Co. Ltd., Japan

[22] Filed: Sept. 16, 1976

[21] Appl. No.: 724,107

[52] U.S. Cl. .................................. 222/1; 214/17 D; 222/318; 222/330; 222/410

[51] Int. Cl.² .......................................... B65G 65/30

[58] Field of Search .............. 222/410, 330, 318, 1; 198/635; 214/17 D

[56] References Cited

UNITED STATES PATENTS 3,877,587  4/1975  Ishizaki ............................ 214/17 D Primary Examiner—Stanley H. Tollberg
Assistant Examiner—Hadd Lane
Attorney, Agent, or Firm—Steinberg & Blake

[57] ABSTRACT

A powder-feeding method and apparatus according to which it is possible to provide one or a plurality of powder-feeding flows in which the powder is fed at a substantially constant rate which is of relatively small magnitude. A cone of powder is maintained substantially centrally of a disc which is rotated at a constant speed. A coarse scraper blade extends inwardly across the periphery of the disc into the cone of powder thereon substantially radially with respect to the disc so that the coarse scraper blade removes some powder on one side of the blade while leaving on the disc on the other side of the blade a layer of powder the depth of which is determined by the distance between the bottom edge of the coarse scraper blade and the top surface of the disc. Into this layer there projects a precision scraper blade the bottom edge of which is closely adjacent to the upper surface of the disc, so that by way of this precision scraper blade it is possible to remove from the layer of predetermined depth powder which drops from the edge of the disc at a substantially constant rate capable of providing a precision powder feeding rate of relatively small magnitude.

14 Claims, 3 Drawing Figures

POWDER FEEDING APPARATUS AND METHOD

BACKGROUND OF THE INVENTION

The present invention relates to the feeding of bulk materials.

In particular, the present invention relates to the feeding of powder, or in other words relatively dry bulk material in fine particulate form.

Presently known powder feeders are generally designed to supply a relatively large flow of powder on the order of several killograms per hour or more. However, such conventional devices are incapable of supplying a minimum flow of powder. In those cases where relatively small powder supply is required, it is necessary at the present time to resort to inconvenient hand operations, and of course such operations lack precision and are highly expensive.

SUMMARY OF THE INVENTION

It is accordingly a primary object of the present invention to avoid the above problems by providing a method and apparatus according to which it becomes possible to provide a precise feed of a powder at a substantially constant rate which is relatively small.

Thus, it is an object of the present invention to provide a powder-feeding method and apparatus capable of precisely supplying a small flow of powder on the order of several tens of grams per hour or less, an operation which cannot be achieved with conventional powder feeders.

It is also an object of the present invention to provide a method and apparatus according to which it becomes possible to provide multiple feeds of powder with each of these feeders being at a substantially constant rate of small magnitude.

Further, it is an object of the present invention to provide a method and apparatus according to which it becomes possible conveniently to transport the powder which is fed to a desired location.

In addition, it is an object of the present invention to provide a method and apparatus which are relatively simple and inexpensive while at the same time being highly reliable in operation.

Also, it is an object of the present invention to provide a structure and method of the above type which include the capability of adjustment so as to vary the rates of feed as desired.

According to the method of the invention a cone of powder is maintained substantially centrally on the upper surface of a horizontal disc which is rotated about its vertical axis at a constant speed. A coarse scraper extends radially across the outer peripheral edge of the disc into the cone of powder to remove some of the powder from the disc while leaving on the disc beyond the bottom edge of the coarse scraper a layer of powder of substantially constant thickness. A precision scraper extends into the layer of powder of substantially constant thickness to a given extent so as to remove from the layer powder which falls from the edge of the disc at a substantially constant rate. The apparatus of the invention includes the above rotary disc which is driven about its vertical axis by a suitable drive means, so as to rotate at a constant speed, while a supply means cooperates with the disc to maintain thereon a substantially conical body of powder situated substantially centrally of the disc on the top surface thereof. A coarse scraper blade which has a bottom edge which is parallel to the top surface of the disc extends radially across the outer peripheral edge of the disc inwardly toward the vertical axis about which the disc rotates and this coarse scraper blade projects into the body of powder so that while some of the powder is removed by the coarse scraper blade on the upstream side of the coarse scraper blade, considered in the direction of rotation of the disc, on the downstream side of the coarse scraper blade there will be a layer of constant thickness traveling with the disc beyond the coarse scraper blade. A precision scraper blade has a bottom edge situated closely adjacent to the top surface of the disc in the path of movement of the layer which travels beyond the coarse scraper blade, and this precision scraper blade extends toward the axis of rotation of the disc to an extent less than the coarse scraper blade so that the precision scraper blade extends only partly across the layer of powder issuing beyond the bottom edge of the coarse scraper blade. This precision scraper blade will thus remove from the disc powder which falls from the edge of the disc at the upstream side of the precision scraper blade at a substantially constant rate.

BRIEF DESCRIPTION OF DRAWINGS

The invention is illustrated for example in the accompanying drawings which form part of this application and in which.

DESCRIPTION OF PREFERRED EMBODIMENTS

According to the present invention the powder feeding apparatus has a disc which rotates at a constant speed while having powder fed thereto from a hopper. The powder which is on the disc is levelled continuously into a layer of predetermined thickness, and from this layer there is discharged from the disc, in a continuous manner, by one or more precision scraper blades, powder which is adapted to be transported to a remote location for example by air.

Figure 1:
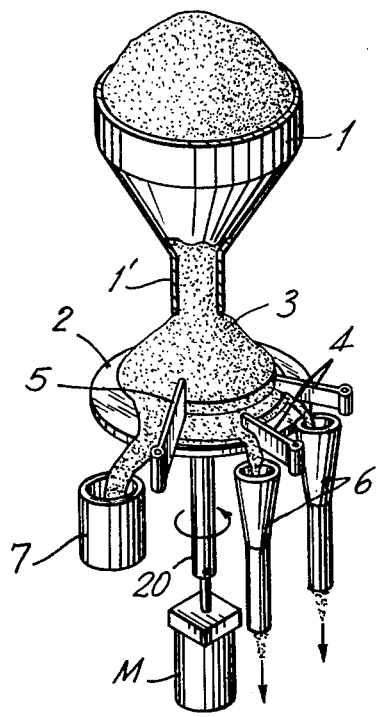
FIG. 1 is a perspective illustration of one possible method and apparatus according to the invention.

Referring to FIG. 1, there is illustrated therein a rotary disc 2 which is horizontal and which is rotated about a vertical axis passing through the center of the horizontal disc 2. Fixed to the disc 2 at its lower surface and centrally thereof is a rotary drive shaft the axis of whch coincides with the axis of rotation of the disc 2, and this rotary drive shaft is driven by a motor M. This drive means formed by the motor M and the shaft driven thereby and fixed to the disc 2 rotates the disc 2 at a constant angular velocity.

A supply means is provided to supply to the top surface of the disc 2 a substantially conical body 3 of powder which is maintained on the top surface of the disc 2 substantially centrally thereof. In the illustrated example the supply means takes the form of a stationary hopper 1 carried by any suitable structure so as to remain stationary over the disc 2 in the manner illustrated in FIG. 1. The motor M is itself supported by a suitable unillustrated structure so that the outer housing of the motor M remains stationary and the motor M supports the drive shaft which in turn supports the disc 2 for rotation about a vertical axis passing through the center thereof as pointed out above. The axis of the hopper 1 is also vertical and coincides with the axis about which the disc 2 rotates. The hopper 1 is provided with a supply of powder from time to time in any suitable way so that during operation of the apparatus and method of the invention there is always a supply of powder within the hopper 1 to issue therefrom out of the bottom central outlet 1' thereof. This bottom central outlet 1' of the hopper is situated centrally over the disc 2 at such a distance therefrom that the substantially conical body of powder 3 is continuously maintained on the disc 2 in the manner shown in FIG. 1 while the disc 2 rotates at a constant speed.

A stationary coarse scraper blade 5, made of any suitable metal or plastic and being substantially rigid, extends radially across the outer peripheral edge of the disc 2 inwardly toward the axis of rotation thereof, this blade 5 having a bottom edge which is parallel to the top surface of the disc 2. This stationary coarse scraper blade 5 extends into the substantially conical body of powder 3 which of course rotates with the disc 2. The distance between the bottom edge of the coarse scraper blade 5 and the top surface of the disc 2 is capable of being adjusted in a manner described in greater detail below. Thus, at the upstream side of the scraper 5, which is the left side thereof, as viewed in FIG. 1, some of the powder will be removed, and this powder can be received in a suitable receptacle 7 which is supported by any suitable structure and positioned as shown in FIG. 1 to receive the powder falling from the disc 2 at the upstream side of the scraper 5. Of course the disc 2 rotates in a counterclockwise direction, as viewed in FIG. 1. This direction of rotation is indicated by the arrow extending around the drive shaft which is fixed to the shaft 2. The result of this arrangement is that there will issue beyond the bottom edge of the scraper 5, at the downstream side thereof, considered in the direction of rotation of the disc 2, a levelled layer of powder which is of a predetermined thickness and which also rotates with the disc 2 beyond the scraper 5, as illustrated in FIG. 1.

One or more precision scraper blades 4 are situated in the path of travel of this layer of powder issuing beyond the bottom edge of the coarse scraper 5. Thus, FIG. 1 shows the first precision scraper blade 4 which is stationary and situated upstream of the second precision scraper blade 4 which is also stationary. The first blade 4 which encounters the layer of powder extends radially inwardly toward the axis of rotation of the disc 2 across the outer peripheral edge thereof and into the layer to a predetermined extent, this first blade 4 of course extending toward the axis of rotation of the disc 2 to an extent less than the blade 5. Inasmuch as the bottom edge of the blade 4 is situated closely adjacent to the top surface of the disc 2, this blade 4 is capable of removing from the layer of predetermined thickness powder which falls at a substantially constant rate into the open top end of the left pipe 6 of FIG. 1.

In much the same way the right pipe 6 of FIG. 1 receives in its top end powder which also flows at a constant rate from the edge of the disc 2, this second feed being provided by way of the second blade 4 shown at the right of FIG. 1 which is identical with the first blade 4 except that it extends inwardly toward the axis of rotation of the disc 2 to an extent greater than the first blade 4 so that this second blade will encounter the part of the layer which moves beyond the inner tip of the first blade 4 to remove a second part of the layer issuing from the coarse blade 5.

Of course, it is possible to provide any desired number of precision scraper blades 4 with successive blades, as viewed in the direction of rotation of the disc 2, having their inner ends situated successively closer to the axis of rotation of the disc, although the last one of the blades will not have its inner tip situated closer to the axis of rotation than the inner tip of the coarse scraper 5.

The bottom edges of the precision scraper blades 4 may contact the upper surface of the disc, but in this event there is only an extremely light contact so that there will be no friction between the blades 4 and the disc 2 which will load the motor M. However, these blades 4, as well as the blade 5, are capable of being adjusted in elevation so that the thrust onto the top surface of the disc provided by any one of the blades is freely adjustable.

With the arrangement of FIG. 1 it is thus possible to provide a plurality of pipes 6 respectively having open tops to receive the multiple feeds of powder at a substantially constant rate which is of a relatively small magnitude, while, as pointed out above, the receptacle 7 will receive the powder removed at the upstream side of the blade 5. Thus, by way of the hopper 1 the powder material is discharged to form the cone 3 where the powder is distributed approximately evenly onto the disc 2 while rotating at a constant angular velocity with the disc 2 as a result of the drive derived from the motor M, and the coarse scraper 5 will provide a levelled layer of predetermined thickness corresponding to the clearance between the bottom edge of the blade 5 and the top surface of the disc, this thickness being adjusted by way of adjusting the elevation of the blade 5. This thin layer of powder which issues beyond the blade 5 is discharged from the disc by way of one or more of the scraper blades 4 as described above, these blades protruding inwardly over the disc beyond the outer peripheral edge thereof.

The discharge per unit time of the powder is controlled by adjusting the peripheral speed of the disc 2, the clearance between the coarse scraper blade 5 and the disc 2 and the thrusts of the precision scraper blades 4 at the top surface of the disc 2. Through such adjustments it is possible to achieve a powder feed of high precision, permitting small amounts of powder to discharge or flow freely and accurately.

The following table shows test results achieved with the method and apparatus of the invention:

| Test No. | 1 | 2 | 3 | 4 | 5 | 6 | 7 | 8 |
|---|---|---|---|---|---|---|---|---|
| Discharge (g/H) | 45.4 | 45.1 | 45.9 | 45.7 | 45.8 | 46.0 | 45.2 | 45.5 |

In the above tests the powder which was used was a fine powder of cryolite having a density of 0.4. The scraper blade 5 was adjusted to provide a layer thickness of 4 mm. A single precision scraper blade 4 provided the above discharge rates, this blade 4 providing a predetermined thrust by being spaced at its bottom edge from the top surface of the disc 2 by a clearance of 1 mm. The disc 2 was rotated at a constant speed of 5/6 rpm, and the radius of the disc 2 was 300 mm.

The powder received in the receptacle 7 can be fed back to the hopper 1 either manually or automatically by way of a suitable conveyer, and this feedback operation can be repeatedly carried out.

Figure 2:
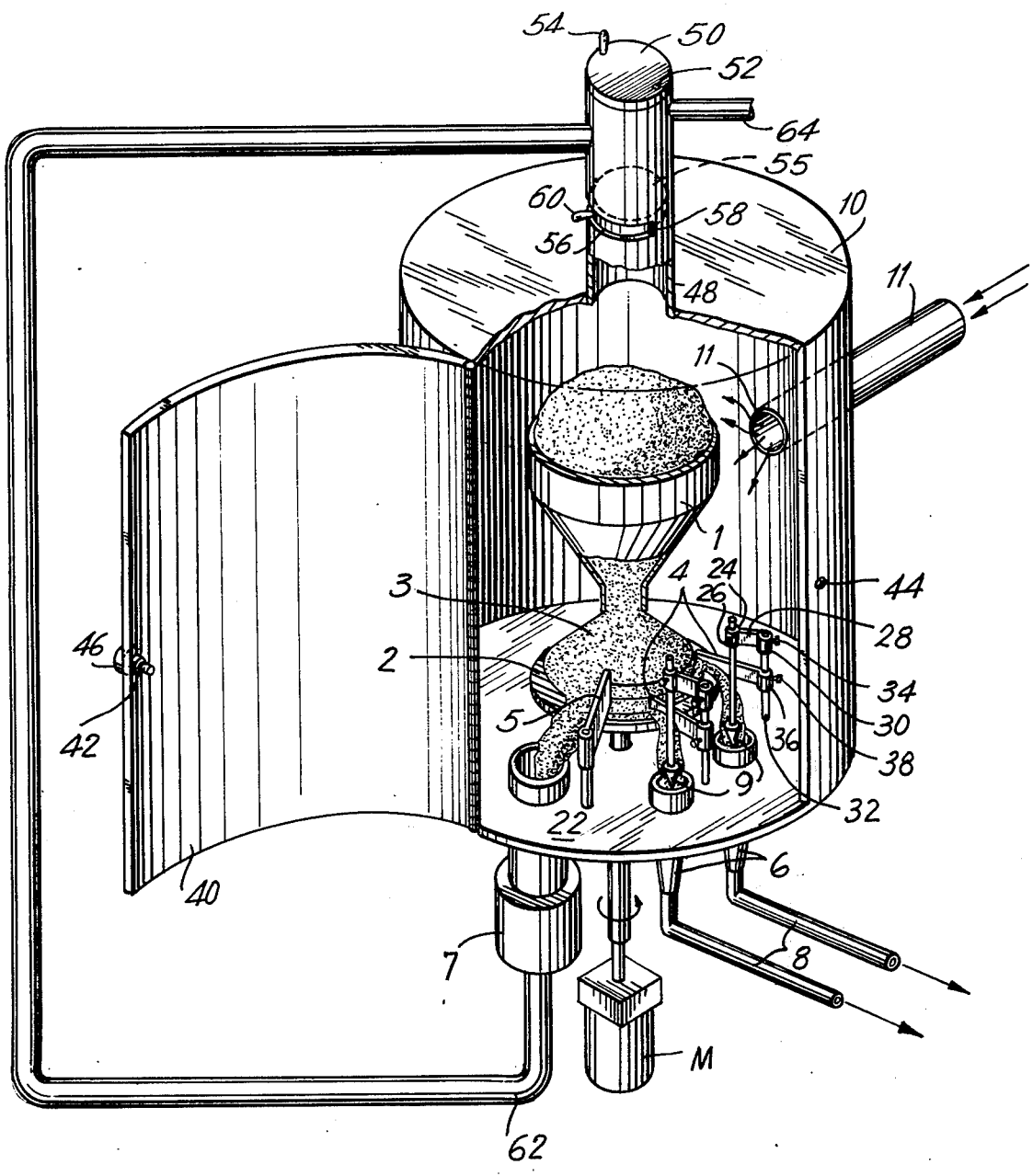
FIG. 2 shows the structure of FIG. 1 combined with additional structure for providing air-transport of the powder.

In the embodiment of the invention which is illustrated in FIG. 2, the structure described above and shown in FIG. 1 is combined with a structure for providing for air-transport of the issuing powder. For this purpose the drive shaft 20 extends with small clearance through a central opening formed in the bottom wall 22 of a pressure vessel or housing 10, the top open ends of the pipes 6 as well as the receptacle 7 being situated within the housing 10 adjacent to the bottom wall 22 thereof as illustrated in FIG. 2. For this purpose the top ends of the pipes 6 and the receptacle 7 extend tightly through suitable openings formed in the bottom wall 22 of the housing 10.

Situated over the top open ends of the pipes 6 are valves 9, respectively, which are provided to adjust the flow of air into the pipes 6. These valves 9 are in the form of simple conical elements fixedly carried by rods which extend at their upper end regions through sleeves 24 carrying set screws 26 capable of adjustably fixing the rods which carry the valves 9 so that in this way the elevation of the valves 9 can be adjusted. The sleeves 24 are fixedly carried by plates 28 which in turn are fixed to sleeves 30 which are respectively slidable on stationary posts 32 fixedly carried by the bottom wall 22, in the manner shown most clearly in FIG. 3. These sleeves 30 are provided with set screws 34 by means of which the elevation of the plates 28 on the posts 32 can be adjusted.

Figure 3:
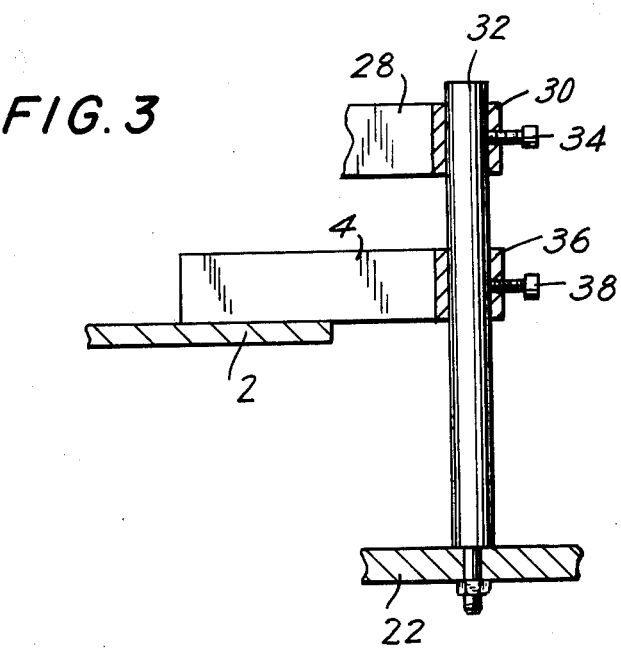
FIG. 3 is a fragmentary partly sectional elevation showing details of the structure, and in particular the manner in which components are adjustable.

The scraper blades 4 are respectively provided at their outer ends with sleeves which also receive the posts 32 in the manner shown for one of the scraper blades 4 in FIG. 3. The sleeves 36 respectively situated at the outer ends of the blades 4 carry set screws 38 which can be utilized for adjusting the elevation of the blades 4 with respect to the top surface of the disc 2, as is apparent from FIG. 3. The same structure is utilized in connection with the blade 5.

As is schematically shown in FIG. 2, the housing or pressure vessel 10 is provided with a swingable door 40 which can be opened to the position schematically indicated in FIG. 2 for giving access to the structure within the housing 10. This door 40 can be swung to a closed position, fluid- tightly closing off the interior of the housing 10 from the exterior. For this purpose the door 40 has an opening 42 which becomes aligned with a threaded opening 44 formed in a wall portion of the housing 10. When the door 40 is moved to its closed position, a bolt 46 can be passed through the opening 42 and threaded into the opening 44 so as to tightly maintain the door 40 in its closed position preventing any escape of air from the housing 10 at the location of the door 40.

Air under pressure is supplied from any suitable source through a pipe 11 which communicates with the interior of the housing 10 in the manner shown in FIG. 2. Thus, this air under pressure will flow into the pipes 6 in a manner controlled by the valves 9, and the continuations 8 of the pipes 6 serve to carry the flowing air with the powder suspended therein to a desired location. Thus in the pipes 8 there is a solid-air two-phase flow from the pressure vessel 10 capable of transporting the powder to a desired remote location.

The pressure vessel or housing 10 can be supported by any suitable structure which is not illustrated. The hopper 1 can be supported in the interior of the vessel 10 by any suitable struts or the like fixed to the outer side wall of the vessel 10 and extending inwardly therefrom to have their inner ends fixed to the outer surface of the hopper 1. With the structure as described above, it is possible simply to open the door 40 from time to time so as to replenish the supply of powder in the hopper 1 as required. In view of the relatively small rate of feed provided for the powder, once the hopper 1 is filled the structure can operate for considerable time before it is necessary to add additonal powder to the hopper 1, and as was pointed out above, the distance of the bottom outlet of the hopper 1 from the disc 2 is such that the conical body 3 will be maintained as illustrated during substantially the entire operation. Of course, the powder collected in the receptacle 7 can also be returned by hand to the hopper 1, as pointed out above.

However, it is also possible to provide an arrangement as indicated in FIG. 2 according to which a pipe 48 is fixed to and projects upwardly from the top wall of the vessel 10, this pipe 48 having a bottom open end communicating with a central opening in the top wall of the vessel 10, so that the interior of the pipe 48 communicates with the interior of the vessel 10. At its top end the pipe 48 is closed by way of a swingable cover 50 hinged by a suitable pin 52 directly to the pipe 48 at the top end surface thereof. This closure plate 50 is provided with a suitable handle 54 by means of which the operator can swing the closure plate 50 to and from the closed position thereof illustrated in FIG. 2.

At a location somewhat higher than the top wall of the vessel 10, the pipe 48 is provided with a horizontal slit 56 extending partly therethrough and receiving a circular partition plate 55 which closes the pipe 48 when the partition 55 is in the position illustrated in FIG. 2. The circular partition 54 is provided along part of its outer peripheral edge with a hinged connection 58 to the pipe 48. Partition 55 carries a handle 60 so that the operator can swing the partition 55 about the hinge 58 to and from the position closing the pipe 48 as illustrated in FIG. 2.

An air-transport pipe 62 communicates at one end with the receptacle 7 at the lower region thereof. This air-transport pipe 62 extends up to and communicates with the pipe 48 between upper closure plate 50 thereof and the partition 55. A pipe 64 communicates also with the pipe 48 between the plates 50 and 55 so that air can discharge out of the pipe 48 through the pipe 64. It will be noted that the pipe 64 is situated at an elevation substantially higher than the location where the pipe 62 communicates with the pipe 48 between the plates 50 and 55.

With the above-described structure, and with the parts in the position shown in FIG. 2, powder collected in the receptacle 7 will be automatically transported by the air under pressure through the pipe 62 into the pipe 48 to collect on the partition 55 while the air escapes without powder through the higher pipe 64. After passage of a certain time, the operator can swing the partition 55 away from its position closing the pipe 48 so that the powder which collects on the partition 55 will be free to fall into the hopper 1.

In addition, from time to time the operator can both remove the partition 55, swinging it about the hinge 58, and also open the cover 50 so as to supply additional powder to the hopper 1 without opening the door 40.

It is therefore apparent that with the above method and apparatus of the invention it is possible to supply an extremely small flow of powder at high precision while at the same time the construction is simple and the manipulations required in connection with the method are also extremely convenient. The manufacturing cost of the structure is also very low. It is thus clear that many advantages are achieved by way of the method and apparatus of the invention.

What is claimed is:

1. A powder feeding method comprising the steps of rotating a horizontal disc about a vertical axis passing through the center thereof at a predetermined constant speed, maintaining on the rotating disc, substantially centrally thereof, a substantially conical body of powder which thus rotates together with the disc, situating over the disc a stationary coarse scraper which extends substantially radially with respect to the disc across the outer periphery thereof inwardly toward said axis into the conical body of powder with the coarse scraper having a bottom edge parallel to the disc and situated at a given distance therefrom so that part of the powder from the cone is removed from the disc on one side of the scraper while a layer of powder of a predetermined radial width and thickness turns with the disc beyond the bottom edge of the coarse scraper, and situating in the path of said layer a precision scraper having a bottom edge located closely adjacent to an upper surface of the disc with said precision scraper also extending substantially radially with respect to said disc across the outer peripheral edge thereof inwardly toward said axis to an extent less than said coarse scraper, so that at least part of said layer is removed from said disc by said precision scraper, whereby said precision scraper will feed powder at a substantially constant rate from said disc.

2. A method as recited in claim 1 and wherein said precision scraper projects into said layer through only a fraction of the radial width thereof, and situating beyond said precision scraper an additional precision scraper which extends radially across the peripheral edge of said disc toward said axis to an extent greater than said first-mentioned precision scraper but not greater than said coarse scraper so that an additional part of said layer is removed from said disc by said additional scraper, whereby the latter will provide a second powder feed at a subsstantially constant rate.

3. A method as recited in claim 1 and including the step of returning to said cone the powder removed by said coarse scraper.

4. A method as recited in claim 1 and wherein said cone is maintained on said disc by situating over said discc a hopper with a supply of powder and having a bottom outlet situated centrally over said disc at a distance sufficiently close thereto for maintaining the cone of powder extending from said bottom outlet down to the upper surface of said disc.

5. A method as recited in claim 1 and including the step of situating in the path of powder removed by said precision scraper a pipe into which the latter powder falls, and directing a stream of air through said pipe to convey the powder therethrough.

6. In a powder-feeding apparatus, a horizontal disc, means connected to said disc at a lower surface thereof for rotating said disc at a constant speed about a vertical axis which passes through the center of said disc, supply means situated over said disc for maintaining a substantially conical body of powder on an upper surface of said disc substantially centrally thereof, a stationary coarse scraper blade situated over said upper surface of said disc and having a bottom horizontal edge situated at a given distance from the upper surface of said disc, said coarse scraper blade extending substantially radially with respect to said disc across an outer peripheral edge thereof inwardly toward said axis to an extent sufficient to extend into the conical body of powder for removing part of the powder from said disc while providing beyond the bottom horizontal edge of said coarse scraper blade a layer of powder of a given thickness and radial width which turns with the disc beyond said coarse scraper blade, and at least one precision scraper blade situated directly next to the upper surface of said disc and extending radially across the outer peripheral edge thereof inwardly toward said axis to an extent less than said coarse scraper blade, with said precision scraper blade being situated downstream of said coarse scraper blade in the direction of rotation of said disc in the path of the layer of powder which travels with said disc beyond the lower edge of said coarse scraper blade, whereby said precision scraper blade will remove powder at a substantially constant rate from said disc.

7. The combination of claim 6 and wherein at least one additional precision scraper blade is situated directly next to said upper surface of said disc downstream of said first-mentioned precision scraper blade extending substantially radially across the outer peripheral edge thereof inwardly toward said axis to an extent greater than said first-mentioned scraper blade but not greater than said coarse scraper blade, whereby said additional precision scraper blade will also remove powder from said layer at a substantially constant rate, whereby a pair of powder feeds of substantially constant rates are respectively provided by said blades.

8. The combination of claim 6 and wherein a hopper is situated substantially centrally over said disc for containing a supply of powder to be delivered to said cone, said hopper having a bottom outlet situated centrally over said disc at a distance sufficiently close thereto for maintaining a cone of powder issuing from the bottom outlet of said hopper toward said disc, said hopper forming said supply means.

9. The combination of claim 6 and wherein an adjusting means is operatively connected with each of said blades for adjusting the elevation thereof with respect to said disc.

10. The combination of claim 6 and wherein a pipe having a top open end is situated in the path along which powder falls from said disc at said precision scraper blade so that the powder falls into said pipe, and means for directing an air stream through said pipe to convey powder therethrough.

11. The combination of claim 6 and wherein a receptacle having an open top is situated in the path of falling movement of the powder removed by said coarse scraper blade, whereby the latter powder is collected in said receptacle.

12. The combination of claim 11 and wherein a means cooperates with said receptacle for returning powder therefrom to said cone of powder on said disc.

13. The combination of claim 10 and wherein a valve cooperates with the top open end of said pipe for controlling the area at said top open end of said pipe through which powder enters the latter.

14. The combination of claim 13 and wherein an enclosure houses said top open end of said pipe as well as said blades, said rotary disc, and said supply means, and means communicating with the interior of said enclosure for supplying thereto compressed air to flow into said pipe.

* * * * *